United States Patent
Domenighetti

[15] 3,668,983
[45] June 13, 1972

[54] VIBRATIONS GENERATOR WITH MULTIPLE SHAFTS IN SERIES, ESPECIALLY FOR VIBRATING TAMPING MEANS

[72] Inventor: Domenico Domenighetti, Via Nosetto 6, Bellinzona, Switzerland

[22] Filed: May 18, 1970

[21] Appl. No.: 38,075

[52] U.S. Cl. ................................................94/50 V, 74/61
[51] Int. Cl. ...................................................E01c 19/28
[58] Field of Search ..............................94/48, 50; 74/87, 61

[56] References Cited

UNITED STATES PATENTS

| | | | |
|---|---|---|---|
| 3,415,174 | 12/1968 | Kaltenegger | 94/50 |
| 3,069,984 | 12/1962 | Kammerlin | 94/48 X |
| 2,644,379 | 7/1953 | Lowe | 94/48 |
| 3,411,420 | 11/1968 | Martin | 94/50 |
| 3,437,019 | 4/1969 | Peterson | 94/50 |

*Primary Examiner*—Jacob L. Nackenoff
*Attorney*—Young and Thompson

[57] ABSTRACT

Vibrations generator especially for vibrating tamping means, characterized in that it comprises a plurality of rotating shafts, each provided with its own eccentric masses and connected to each other in series by means of coupling elements ensuring the rotational synchronism and transmitting the required torque; each shaft being supported by a single pair of rolling bearings; said shafts series being actuated by a device which applies a torque to at least one of the two ends of said shafts series.

1 Claim, 6 Drawing Figures

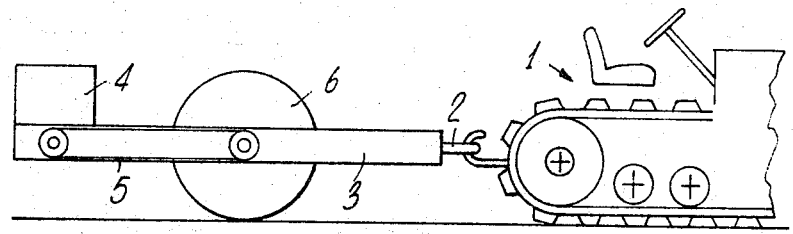
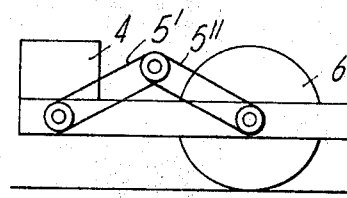
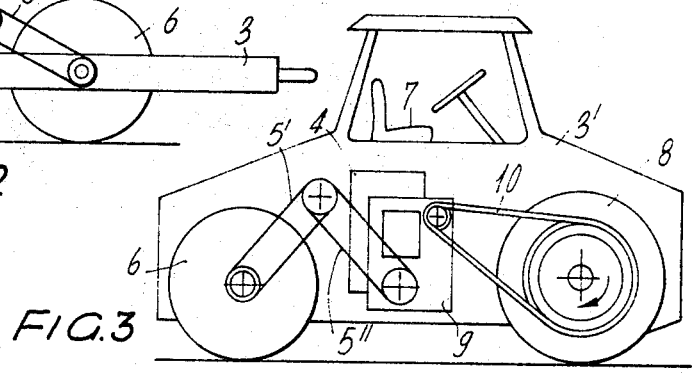
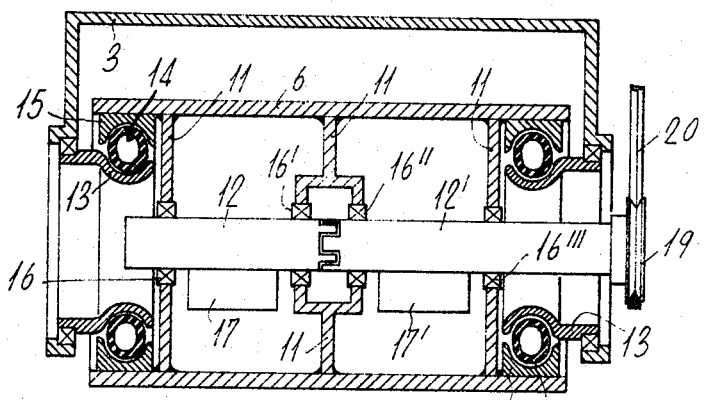

INVENTOR
DOMENICO DOMENIGHETTI

VIBRATIONS GENERATOR WITH MULTIPLE SHAFTS IN SERIES, ESPECIALLY FOR VIBRATING TAMPING MEANS

To set into vibration tamping means such as rollers, vibrating plates or any vibrating means in general, it is common practice to use a rotating shaft mounted by means of rolling bearings on the member to be set into vibration and provided with eccentric masses which provide for the rotary centrifugal force.

This centrifugal rotary force is transmitted over said roll bearings to the member to be set into vibration.

To increase the centrifugal force it is therefore necessary to increase the dimensions of said bearings, since, for having a correct mechanical construction, it is not possible to mount a rotating shaft on more than two bearings.

The increase in dimensions of said two bearings creates both technical and economical problems.

An object of the present invention is to allow for a practically unlimited increase of the centrifugal force without having to increase the dimensions of the bearings but by simply increasing the number thereof.

The problem has been solved by connecting in series two or more shafts, each provided with its own eccentric masses, and connected to each other by means of a mechanical joint providing and ensuring the synchronism thereof while allowing for out-of-alignments between each shaft and its adjacent ones.

According to any particular requirement, said joint may be a teeth joint, a chain joint, a joint with inner and outer broachings, an universal joint or any other type of joint, for instance an elastic band joint, or a membrane joint comprising rubber or metallic inner elements and so on.

The rotating motion is distributed to this series of shafts by means of a pulley, a gear, a hydraulic engine or any other means suitable to apply to at least one end of said shaft series a torque that is sufficiently large to impart the required rotary speed.

According to an other embodiment of the invention the required torque may be applied to both ends of said shafts series so as to more uniformly stress the joints connecting the various shafts.

The accompanying drawings illustrate by way of example only some embodiments of the invention and namely:

FIGS. 1 and 2 are views of two different types of rollers to be towed by any suitable towing means, said rollers being adapted to have applied thereto the vibrations generator according to the present invention.

FIG. 3 is a view of a vibrating self-moving tamping road roller which may have applied thereto the vibrations generator of the invention.

FIG. 4 is a larger scale, axially sectioned view of the vibrating roll of a road roller of the type diagrammatically represented in FIGS. 1, 2 and 3, the vibration being imparted thereto at one end only.

Figure 5:
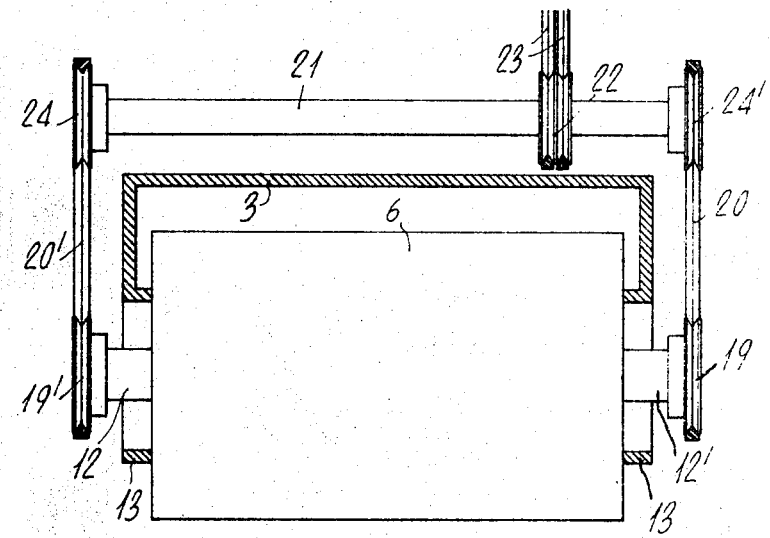
FIG. 5 is a larger scale axially sectioned view of a vibrating roll with a two ends actuation system.

The tamping system shown in FIG. 1 is made up of a towing unit 1 which, over the hook 2, tows the vibrating roll 6 mounted on the trailer carriage 3. Said trailer carriage has mounted thereon the engine 4 which, over a transmission system 5, sets into vibration the roll 6. Said last one is provided with elastic suspension means (not represented) which prevents the vibrations from being transmitted to the trailer carriage or frame 3, to the engine 4 as well as to the towing unit 1.

The tamping system of FIG. 2 is similar to the preceding one but differs therefrom only in that the system transmitting the rotatory motion is subdivided into two separate transmission units 5' and 5".

The tamping unit of FIG. 3 is, on the contrary, a self-moving system consisting of a single machine with a single frame 3 with a guide seat 7, an engine 4, a vibrating roll 6, a driving roll 8, a reduction gear box 9, systems 5', 5" for the transmission of the rotary motion required for the vibration, a system 10 for the chain transmission required to impart the forward motion to the whole tamping unit.

In all the three cases diagrammatically represented in FIGS. 1, 2 and 3, the vibrating tamping means which, by way of example only, has been shown as a roll 6 is provided with the multiple shafts device according to the present invention.

As shown in FIG. 4, the vibrating roll 6 presents the partition walls 11 having mounted therein the two shaft parts 12, 12'. The roll 6 is mounted on the frame 3 by means of elastic pneumatic suspension members, for example formed with the inner metallic element 13, with a pneumatic ring 14 and with an outer metallic element 15. The rotating shafts 12 and 12' are mounted in the partition walls 11 by means of roll bearings 16, 16', 16", 16'''. The rotating shaft 12 is provided with the eccentric mass 17 while the rotating shaft 12' is provided with the eccentric mass 17'. The two shafts 12, 12' are connected to each other by means of a joint 18 which may be for example a joint with frontal teeth, which ensures a perfect synchronism of rotation while allowing for a certain out-of-alignment of the two shafts. The pulley 19, mounted at one end of the shaft 12' is actuated by a transmission belt 20 consenting to transmit to both the shafts 12 and 12' the required torque.

FIG. 5 shows a further embodiment of the shaft which differs from the preceding one only in that also the other shaft 12 extends outwards and has a pulley 19' mounted on its projecting part, said pulley being actuated by a transmission belt 20'. The two belts 20 and 20' are driven by two pulleys 24, 24' fixed to the ends of a countershaft 21 which, in its turn, is actuated by a pulley 22 operated over transmission belts 23 driven by the engine itself.

Figure 6:
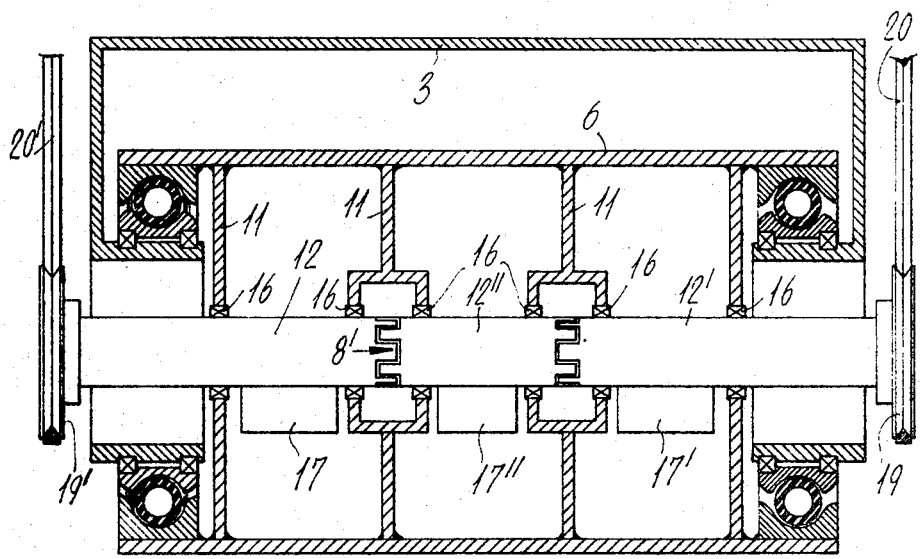
FIG. 6 is a view of a further vibrating roll having a series of shafts the number of which is larger than the one in the two preceding embodiments.

FIG. 6 illustrates a vibrating roll 6 provided with a larger number of partition walls 11 since it comprises three rotating shafts 12, 12', 12" which are mounted on said partition walls 11 by means of a plurality of rolling bearings 16. Each shaft is supported by only one pair of bearings 16.

The three mentioned shafts are interconnected by two joints 8' and 8". The shaft 12 is provided with the eccentric mass 17, the shaft 12' with the eccentric mass 17' and the shaft 12" with the eccentric mass 17".

The advantages obtained by this disposition derive from the possibility of increasing at will the centrifugal force by simply multiplying the number of the shafts with eccentric masses while keeping the centrifugal force for each shaft always below the values allowed by the relative pair of rolling bearings utilized, which bearings should be of normal and conventional type and easily found on the market.

What is claimed is

1. Vibratory drum tamping means, comprising a unitary cylindrical drum, a series of at least three shafts in said drum in end-to-end relationship, each of said shafts having an eccentric mass thereon, said eccentric masses being in alignment with each other lengthwise of said series of shafts, coupling means at the ends of said shafts interconnecting adjacent ends of said shafts for transmitting torque between said shafts and ensuring conjoint rotation of said shafts, said drum being hollow and having a plurality of axially spaced internal supports thereon including a pair of end supports adjacent the ends of the drum and a plurality of spaced intermediate supports between said end supports, said end supports having bearings thereon for said shafts, each intermediate support having a pair of axially spaced bearings thereon each supporting an end of one of said shafts, said coupling means being located between said axially spaced bearings, and driving means to apply torque to at least one end of said series of shafts.

* * * * *